United States Patent
Shen et al.

(10) Patent No.: US 7,273,295 B2
(45) Date of Patent: Sep. 25, 2007

(54) LIGHTING MODULE AND BACKLIGHT MODULE

(75) Inventors: Chang-Ho Shen, Hsinchu (TW); Ern-Hoo Then, Hsinchu (TW); Chih-Kang Tung, Miao Li Hsien (TW); Wen-Hsin Lin, Miao Li Hsien (TW)

(73) Assignee: AU Optronics Corp., Hsinchu (TW)

( * ) Notice: Subject to any disclaimer, the term of this patent is extended or adjusted under 35 U.S.C. 154(b) by 0 days.

(21) Appl. No.: 11/348,455

(22) Filed: Feb. 7, 2006

(65) Prior Publication Data
US 2006/0187665 A1 Aug. 24, 2006

(30) Foreign Application Priority Data
Feb. 18, 2005 (TW) .............................. 94104783 A

(51) Int. Cl.
*F21V 19/00* (2006.01)
(52) U.S. Cl. .................... 362/216; 362/225; 362/217; 362/223; 362/224
(58) Field of Classification Search ........ 362/632–634, 362/614, 613, 223–225, 70, 216, 396, 217; 349/58–60
See application file for complete search history.

(56) References Cited

U.S. PATENT DOCUMENTS

| | | | | |
|---|---|---|---|---|
| 6,880,947 B2 * | 4/2005 | Hsieh et al. | ................ | 362/614 |
| 6,902,300 B2 * | 6/2005 | Lee | ........................... | 362/306 |
| 6,905,224 B2 * | 6/2005 | Yoo et al. | ................... | 362/225 |
| 7,101,069 B2 * | 9/2006 | Yu et al. | ..................... | 362/558 |
| 2004/0012971 A1 * | 1/2004 | Tsai et al. | ................... | 362/390 |
| 2006/0007707 A1 * | 1/2006 | Lee et al. | .................. | 362/632 |

* cited by examiner

*Primary Examiner*—Renee Luebke
*Assistant Examiner*—Robert May
(74) *Attorney, Agent, or Firm*—Birch, Stewart, Kolasch & Birch, LLP

(57) ABSTRACT

A lighting module comprises a bezel, a lamp and a fixing component. The lamp includes two straight portions and one bending portion therebetween. The two straight portions substantially being parallel to each other. A fixing component includes a main body fixed with the bezel and two C-ring structures individually having two ends connecting with the main body. The two straight portions are individually encircled by one of said two C-ring structures and in touch with the main body.

20 Claims, 5 Drawing Sheets

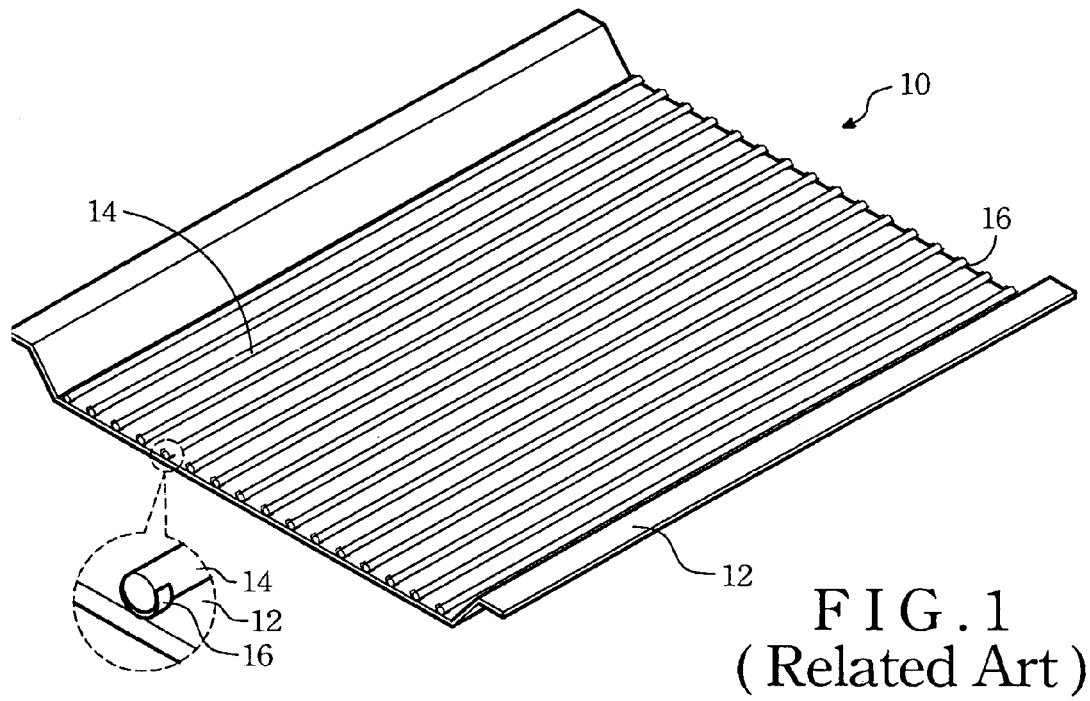
FIG. 1
(Related Art)
FIG. 1A
(Related Art)
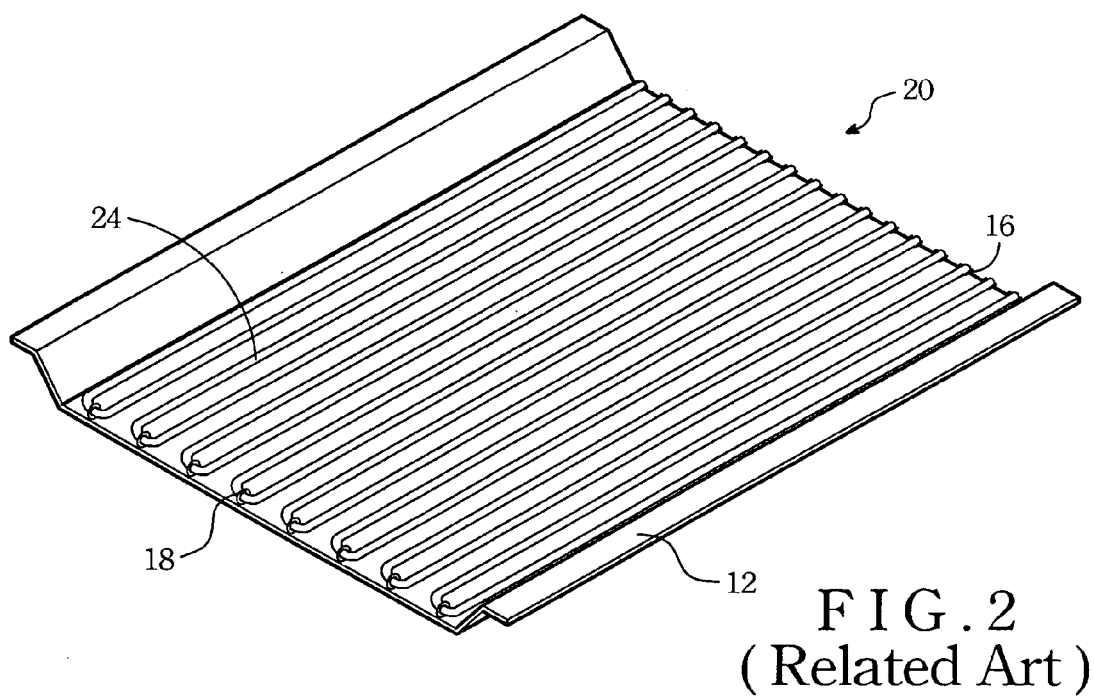
FIG. 2
(Related Art)

LIGHTING MODULE AND BACKLIGHT MODULE

BACKGROUND OF THE INVENTION (1) Field of the Invention

The present invention generally relates to a lighting module, and particularly to a direct-typed backlight module for a liquid crystal display panel.

(2) Description of the Prior Art

Liquid Crystal Display panel (LCD panel) itself is not able to generate light. In order to present images, a backlight source is typically therefore needed. Various different types of backlight modules have already been disclosed and used practically. However, LCD product having a diagonal screen size larger than 20 inches often adopts a "direct-typed backlight module" as its backlight source. Within the direct-typed backlight module, light is actually generated from lamps, such as lamp tubes or U-shaped lamps respectively shown in FIG. 1 and FIG. 2. Alternatively, snake-shaped lamps, which are not shown in figures, are also adopted in prior arts.

Please refer to FIG. 1. A direct-typed backlight module 10 comprises a bezel 12 and a plurality of lamp tube 14. Typically, the lamp tube 14 is very thin and is fixed on the bezel 12 by utilizing some fixing component. Considering the structure of the lamp tube 14 shown in FIG. 1, two fixing components 16 are respectively disposed to support and fix the two ends of one lamp tube 14. As shown in FIG. 1A, which shows the lamp tube 14, the bezel 12 and the fixing component 16 of FIG. 1 on an enlarged scale, the fixing component 16 is designed as a C-shaped ring for facilitating installing the lamp tube 14.

Besides the lamp tube 14 having a straight structure shown in FIG. 1, other bending structures are also used in prior arts. For example, the U-shaped lamp 24 shown in FIG. 2 has a structure comprising one bending portion. Adopting lamp of bending structure generally has the advantage of reducing the amount of lamp electrode. However, the two ends of the U-shaped lamp 24 are located at the same side of the bezel 12. Specific fixing component is needed to fix the bending portion of the U-shaped lamp 24 on the bezel 12.

O-ring 18 is a typical fixing component for the bending portion of the U-shaped lamp 24. The O-ring 18 rings the U-shaped lamp 24 at the bending portion. However, the O-ring 18 is substantially made of plastic materials, such as rubber. It contacts with the U-shaped lamp 24 and has a function as a heat sink. After the backlight module 20 is operated for a while, the portion of the U-shaped lamp 24 coved by the O-ring 18 has a temperature lower than the other portions. Occasionally, the relative low temperature would result in a "pink phenomenon", which means that pink light is generated at this relative low temperature area and defeats the optical quality of the backlight module 24.

To resolve this drawback, a prior art disclosed in the U.S. Pat. No. 6,722,773 has provided a fixing component shown in FIG. 3A and FIG. 3B. FIG. 3A is a perspective view of the U-shaped lamps and the fixing component. FIG. 3B is a cross-sectional view taken along line 3b-3b of FIG. 3A. This prior art generally utilizes the hook structures 162 shown in FIG. 3A and FIG. 3B to support and fix the U-shaped lamp 24. An individual hook structure 162 has a relatively less contact area with the U-shaped lamp 24 than the O-ring 18 of FIG. 2. Because the contact area is reduced, the heat sink ability of the hook structure 24 is not as remarkable as the O-ring 18. The mentioned "pink phenomenon" is somehow resolved. However, also because of the reduced contact area, the fixing ability of the hook structure 162 is not so firm as the O-ring 18. Therefore, these fixing components have to be arranged as FIG. 3A. Obviously, required amount of the fixing components has to increase. And it also results in a complicated assemble process.

As the screen size of liquid crystal display panel keep enlarging, requirement according to the safety approvals becomes much more restricted. Accordingly, some fixing components according to prior arts are not able to conform the standards. Hence, to provide fixing component with reliable fixing ability and without the mentioned drawback of pink phenomenon is an important issue to these art.

SUMMARY OF THE INVENTION

An objective of the present invention is to provide a lighting module. A fixing component is provided for supporting and fixing lamps thereof.

Another objective of the present invention is to provide a fixing component which has a simplified structure capable of facilitating the assemble process.

A lighting module comprises a bezel, a lamp and a fixing component is provided. The lamp includes two straight portions and one bending portion therebetween. The two straight portions substantially being parallel to each other. A fixing component includes a main body fixed with the bezel and two C-ring structures individually having two ends connecting with the main body. The two straight portions are individually encircled by one of said two C-ring structures and in touch with the main body.

These and other objectives of the present invention will no doubt become obvious to those of ordinary skill in the art after reading the following detailed description of the preferred embodiment which is illustrated in the various figures and drawings.

BRIEF DESCRIPTION OF THE DRAWINGS

The present invention will now be specified with reference to its preferred embodiment illustrated in the drawings, in which FIG. 1 is a portion of a direct-typed backlight module according to a prior art.

FIG. 2 is a portion of a direct-typed backlight module according to another prior art.

DESCRIPTION OF THE PREFERRED EMBODIMENT

Figure 3:
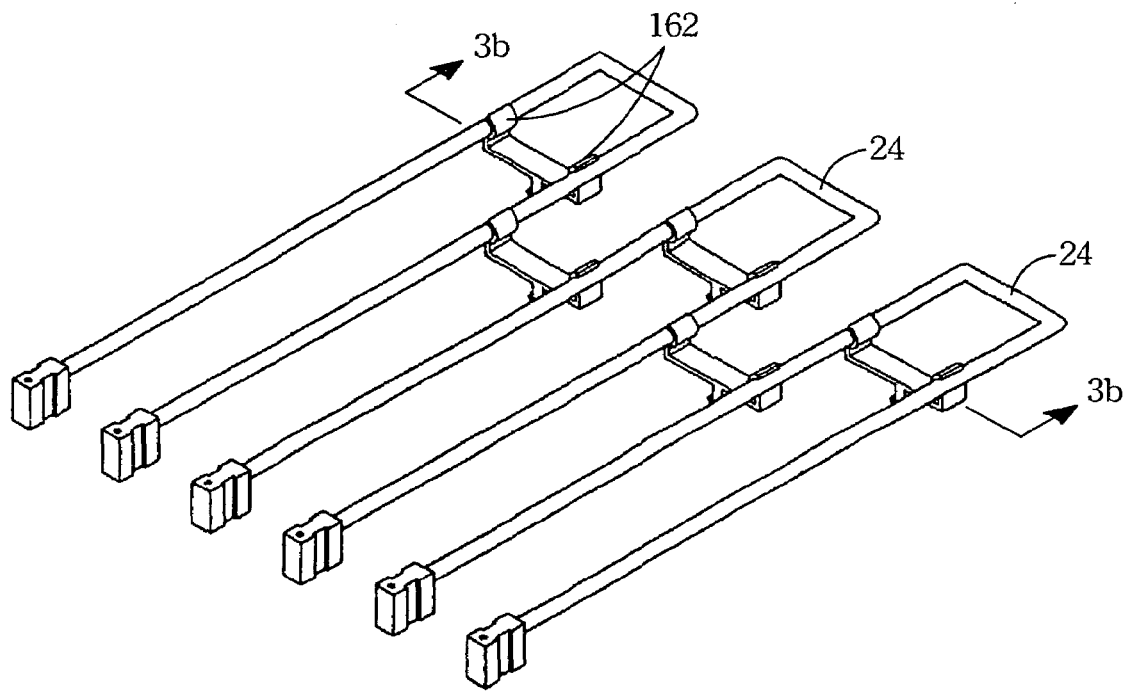
FIG. 3A is a perspective view of U-shaped lamps and fixing components.
FIG. 3B is a cross-sectional view taken along line 3b-3b of FIG. 3A.
Figure 3:
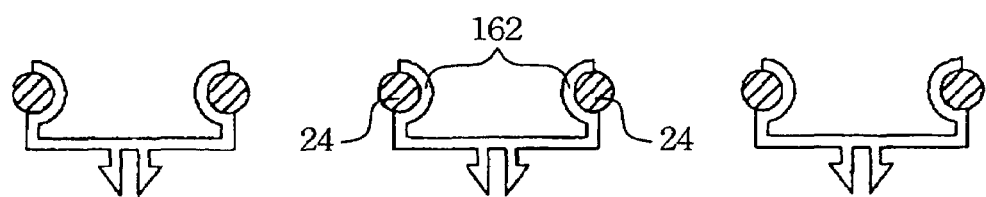
Figure 4:
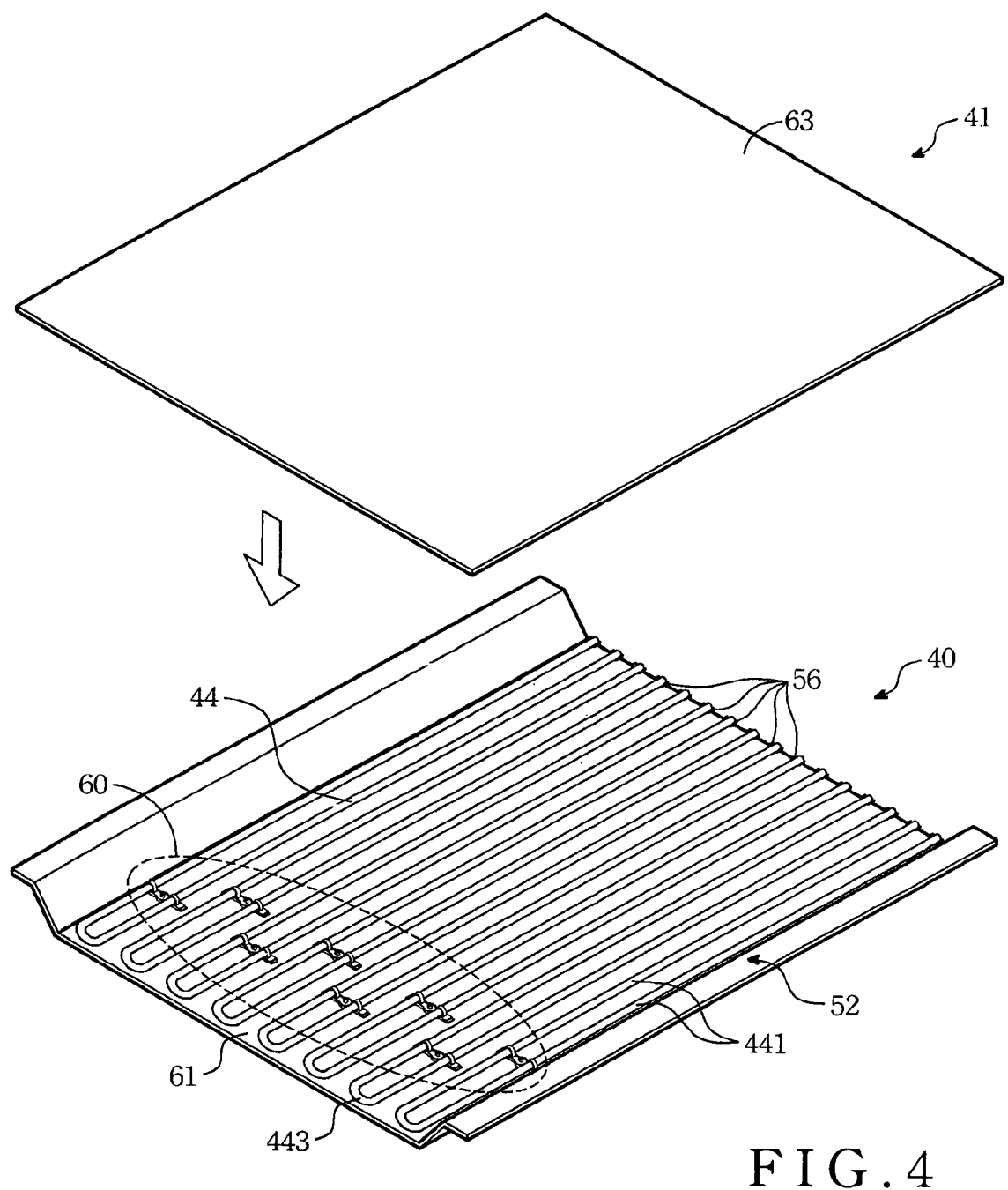
FIG. 4 illustrates an embodiment according to the present invention.

Please refer to FIG. 4. It illustrates an embodiment according to the present invention. A lighting module 40 comprises a lamp 44, a fixing component 60 and a bezel 52. The lamp 44 includes two straight portions 441 and one bending portion 443 therebetween. The two straight portions 441 substantially are parallel to each other. The fixing component 60 includes a main body 601 fixed with the bezel 52 and two C-ring structures 603. The two C-ring structures 603 individually has two ends connecting with the main body 601. In other words, the opening of the C-ring structure 603 is closed. The two straight portions 441 are individually encircled by one C-ring structure 603 and in touch with the main body 601. To utilize the lighting module 40 as a backlight source (a direct-typed backlight module 41) for liquid crystal display panel, substantially, a reflection sheet 61 and a refraction plate 63 is further needed. The reflection sheet 61 is disposed on the bezel 52 and beneath the lamp 44 for enhancing light-utilized percentage. The refraction plate 63 is disposed above the lamp 44 for evenly provides light outward.

Figure 5A:
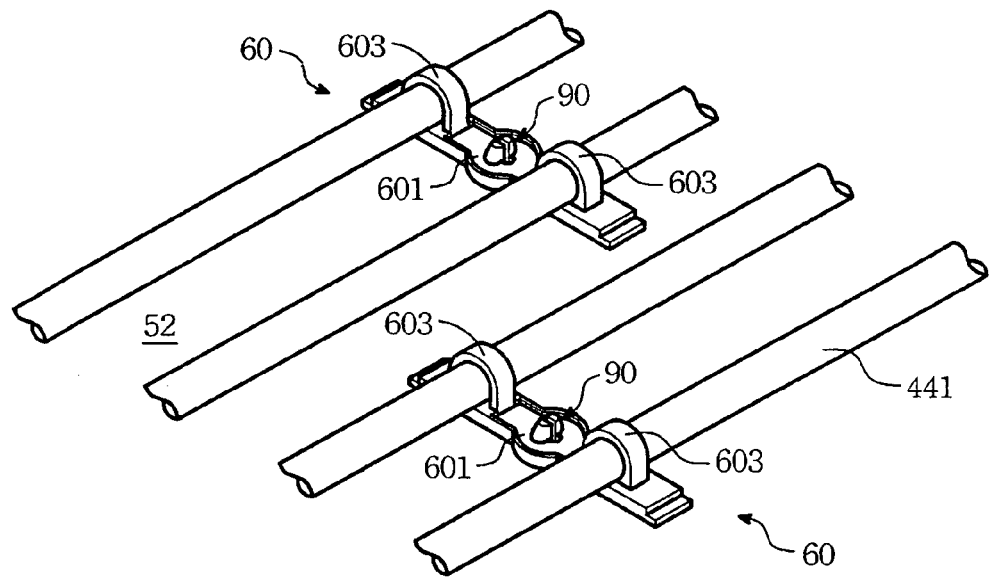
FIG. 5A is a perspective view of lamps and fixing components after assembled according to a present embodiment.
Figure 5B:
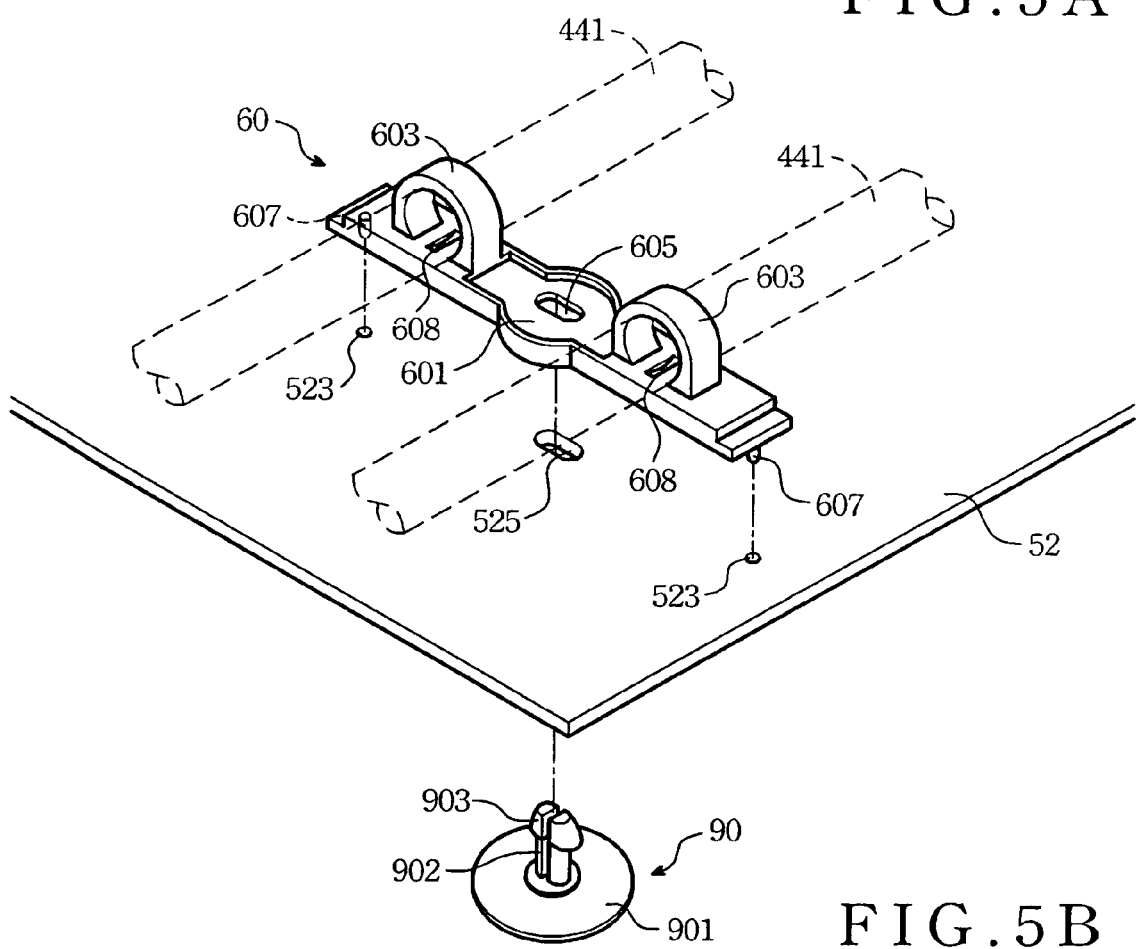
FIG. 5B is an explosive view according to FIG. 5A.

Please refer to FIG. 5A and FIG. 5B, in the present invention, the C-ring structure 603 is designed to have a ring width less than 0.3 centimeter. Through experiments, it is proved that the ring width less than 0.3 centimeter is able to improve the prior drawback of "pink phenomenon". For further reducing contact area between the lamp 33 with the main body 601, the main body 601 has two concaves 608 individually formed in the areas being in touch with the two straight portions 441. In another embodiment, the main body 601 has two through-holes 610 individually formed in the areas being in touch with the two straight portions 441. Besides, the fixing component 60 is made of low thermal conductivity material. The low thermal conductivity material includes polycarbonate (PC), high-reflective polycarbonate plastics, polyethylene (PE), polypropylene (PP) or polyvinyl chloride (PVC). As a result, the prior drawback of "pink phenomenon" is resolved validly.

The lighting module 40 further comprises a bolt 90 for joining the fixing component 60 and the bezel 52 by utilizing a first bolt-hole 605 and a second bolt-hole 525. As shown, the main body 60 has the mentioned first bolt-hole 605, and the bezel 52 has the mentioned second bolt hole 525 correspondingly. The bolt 90 comprises a button 901, a pillar 902 and a bolt-head 903.

In one embodiment, the bolt-head 903 and the first bolt-hole 605 are arranged to have corresponding shapes. During fabrication, the bolt-head 903 and the pillar 902 plug into the second bolt-hole 525 and the first bolt-hole 605 sequentially. Than the button 901 beneath the bezel 52 is turned, so as to fix the fixing component 60 on the bezel 52.

In another embodiment, the bolt-head 903 or the pillar 902 may be made of elastic materials. Or as shown in FIG. 5B, the bolt-head 903 is designed as two separate portions with gap therebetween, and the pillar 902 is also designed as two separate portions likewise. While entering the second bolt-hole 525 or the first bolt-hole 605, the bolt-head 903 would distort inward, so as to entirely pass through the second bolt-hole 525 or the first bolt-hole 605. After passing through the first bolt-hole 605, the bolt-head 903 restores to its original shape and therefore joining with the main body 601. Unless external force making the bolt-head 903 distorting again, the fixing component 60 may be fixed with the bezel 52 firmly.

Please still refer to FIG. 5B, in one of the present embodiments, the fixing component 60 comprises an orientation protrusion 607 protruding downward from the main body 601, and the bezel 52 correspondingly has an orientation concave 523. Utilizing the orientation protrusion 607 combined with the orientation concave 523, the fixing component 60 may be disposed at predetermined position accurately. Therefore, not only the lamps 44 may be disposed at their predetermined positions more precisely than prior arts, the orientation protrusion 607 and the orientation concave 523 also provide an advantage of speeding up aiming the first bolt-hole 605 at the second bolt-hole 525. The fabrication process of the present lighting module 40 or the backlight module 41 is thus accelerated.

In another embodiment, the disposed positions of the mentioned orientation protrusion and the orientation concave are contrary to the embodiment shown as FIG. 5B. Please refer to FIG. 5C, the bezel 52 comprises an orientation protrusion 527, and the fixing component 60 comprises an orientation concave 609 correspondingly. The function and advantage of the orientation protrusion 527 and the orientation concave 609 are similar with the previous embodiment.

Please refer to FIG. 5A and FIG. 5B again, the present lighting module 40 is assembled through the following steps:

Firstly, put the two C-ring structure 603 individually around a straight portion 441 of the lamp 44. The C-ring structure 603 is put around the straight portion 441 through the end of the lamp 44 without the bending portion 443, as shown in FIG. 4.

Secondly, dispose the lamp 44 with the fixing component 60 on the bezel 52. The main body 601 of the fixing component 60 is directly disposed on the bezel 52.

Figure 5C:
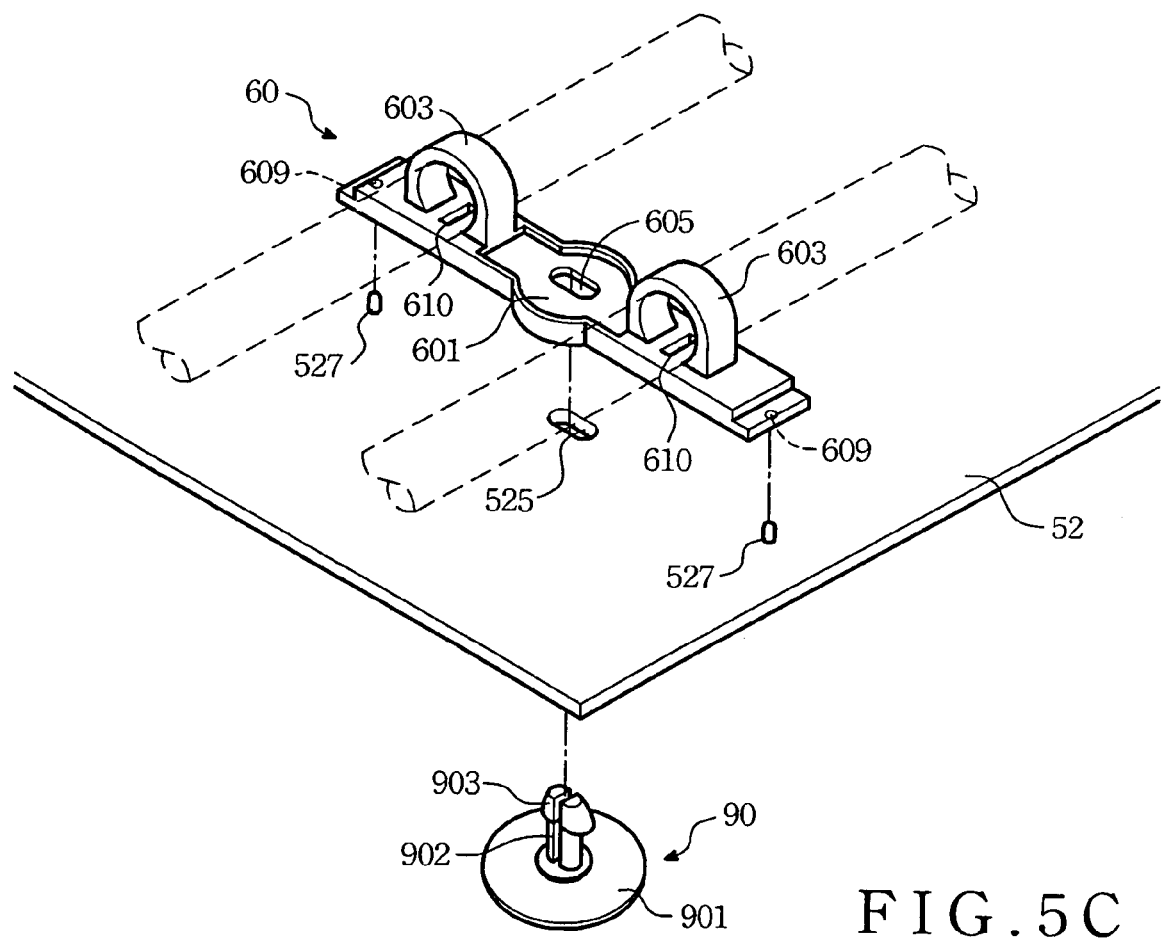
FIG. 5C is an explosive view of lamps, the fixing component, the bezel and the bolt according to another present embodiment.

Next, locate the fixing component 60 at a predetermined position on the bezel 52. In practice, the orientation concave 523 and the orientation protrusion 607 shown in FIG. 5B or the orientation concave 609 and the orientation protrusion 527 shown in FIG. 5C is used to accelerate this locating step. By them, the lamp 44 is able to be located at its predetermined position immediately and accurately.

Then, fix the fixing component 60 on the bezel 52. The bolt 90 is used to fix the fixing component 60 and the bezel 52, through the first bolt-hole 605 and the second bolt-hole 525, in this step.

Accordingly, the present invention has provided a lighting module and a backlight module, a direct-typed backlight module precisely, with a fixing component, which has remarkable fixing and supporting ability. And another remarkable achievement of the present invention is that the "pink phenomenon" has been improved. The related assembling processes have also been concerned. Utilizing the present fixing component, the fabrication process of the lighting module or the backlight module is able to be accelerated. In other words, the present invention is capable of enhancing producing efficiency.

With the example and explanations above, the features and spirits of the invention are hopefully well described. Those skilled in the art will readily observe that numerous modifications and alterations of the device may be made while retaining the teaching of the invention. Accordingly, the above disclosure should be construed as limited only by the metes and bounds of the appended claims.

We claim:

1. A lighting module, comprising:
a bezel having a first bolt-hole;
a lamp, said lamp including two straight portions and one bending portion therebetween, the two straight portions substantially being parallel to each other;
a fixing component, including a main body having a second bolt-hole and two C-ring structures individually having two ends connecting with the main body, wherein the two straight portions are individually encircled by one of said two C-ring structures and in touch with the main body, and each of the C-ring structures having a ring width less than 0.3 centimeter; and a bolt plugging into the first bolt-hole and the second bolt-hole sequentially for joining the bezel and the fixing component.

2. The lighting module of claim 1, wherein the bolt comprises a button, a pillar and a bolt-head, and the pillar connects the button and bolt-head.

3. The lighting module of claim 2, wherein the bolt-head and the pillar have two separate portions, respectively.

4. The lighting module of claim 1, wherein the main body has two concaves individually formed in two areas being in touch with said two straight portions.

5. The lighting module of claim 1, wherein the main body has two through-holes individually formed in two areas being in touch with said two straight portions.

6. The lighting module of claim 1, wherein the fixing component comprises an orientation protrusion, and the bezel comprises an orientation concave correspondingly.

7. The lighting module of claim 1, wherein the bezel comprises an orientation protrusion, and the fixing component comprises an orientation concave correspondingly.

8. The lighting module of claim 1, wherein the fixing component is made of low thermal conductivity material.

9. The lighting module of claim 8, wherein said low thermal conductivity material is polycarbonate (PC), high-reflective polycarbonate plastics, polyethylene (PE), polypropylene (PP) or polyvinyl chloride (PVC).

10. The lighting module of claim 1 further comprising a reflection sheet disposed on the bezel and beneath the lamp.

11. The lighting module of claim 1 further comprising a refraction plate disposed above the lamp.

12. A backlight module, comprising:
a bezel having a first bolt-hole;
a lamp, said lamp including two straight portions and one bending portion therebetween, the two straight portions substantially being parallel to each other;
a fixing component, including a main body having a second bolt-hole and two C-ring structures individually having two ends connecting with the main body, wherein the two straight portions are individually encircled by one of said two C-ring structures and in touch with the main body;
a bolt plugging into the first bolt-hole and the second bolt-hole sequentially for joining the bezel and the fixing component, wherein the bolt comprises a button, a bolt-head and a pillar connecting the button and bolt-head, and the bolt-head and the pillar have two separate portions, respectively;
a reflection sheet, disposed on the bezel and beneath the lamp; and
a refraction plate, disposed above the lamp.

13. The backlight module of claim 12, wherein the fixing component comprises an orientation protrusion, and the bezel comprises an orientation concave correspondingly.

14. The backlight module of claim 12, wherein the main body has two concaves individually formed in two areas being in touch with said two straight portions.

15. The backlight module of claim 12, wherein the main body has two through-holes individually formed in two areas being in touch with said two straight portions.

16. The backlight module of claim 12, wherein the fixing component is made of low thermal conductivity material.

17. The backlight module of claim 16, wherein said low thermal conductivity material is polycarbonate (PC), high-reflective polycarbonate plastics, polyethylene (PE), polypropylene (PP) or polyvinyl chloride (PVC).

18. The backlight module of claim 12, wherein the bezel comprises an orientation protrusion, and the fixing component comprises an orientation concave correspondingly.

19. The backlight module of claim 12, wherein each of the C-ring structures having a ring width less than 0.3 centimeter.

20. A lighting module, comprising:
a bezel having a first bolt-hole;
a lamp, said lamp including two straight portions and one bending portion therebetween, the two straight portions substantially being parallel to each other;
a fixing component, including a main body having a second bolt-hole and two C-ring structures individually having two ends connecting with the main body, wherein the two straight portions are individually encircled by one of said two C-ring structures and in touch with the main body; and
a bolt plugging into the first bolt-hole and the second bolt-hole sequentially for joining the bezel and the fixing component, wherein the bolt comprises a button, a bolt-head and a pillar connecting the button and bolt-head, and the bolt-head and the pillar have two separate portions, respectively.

* * * * *